Patented Sept. 26, 1922.

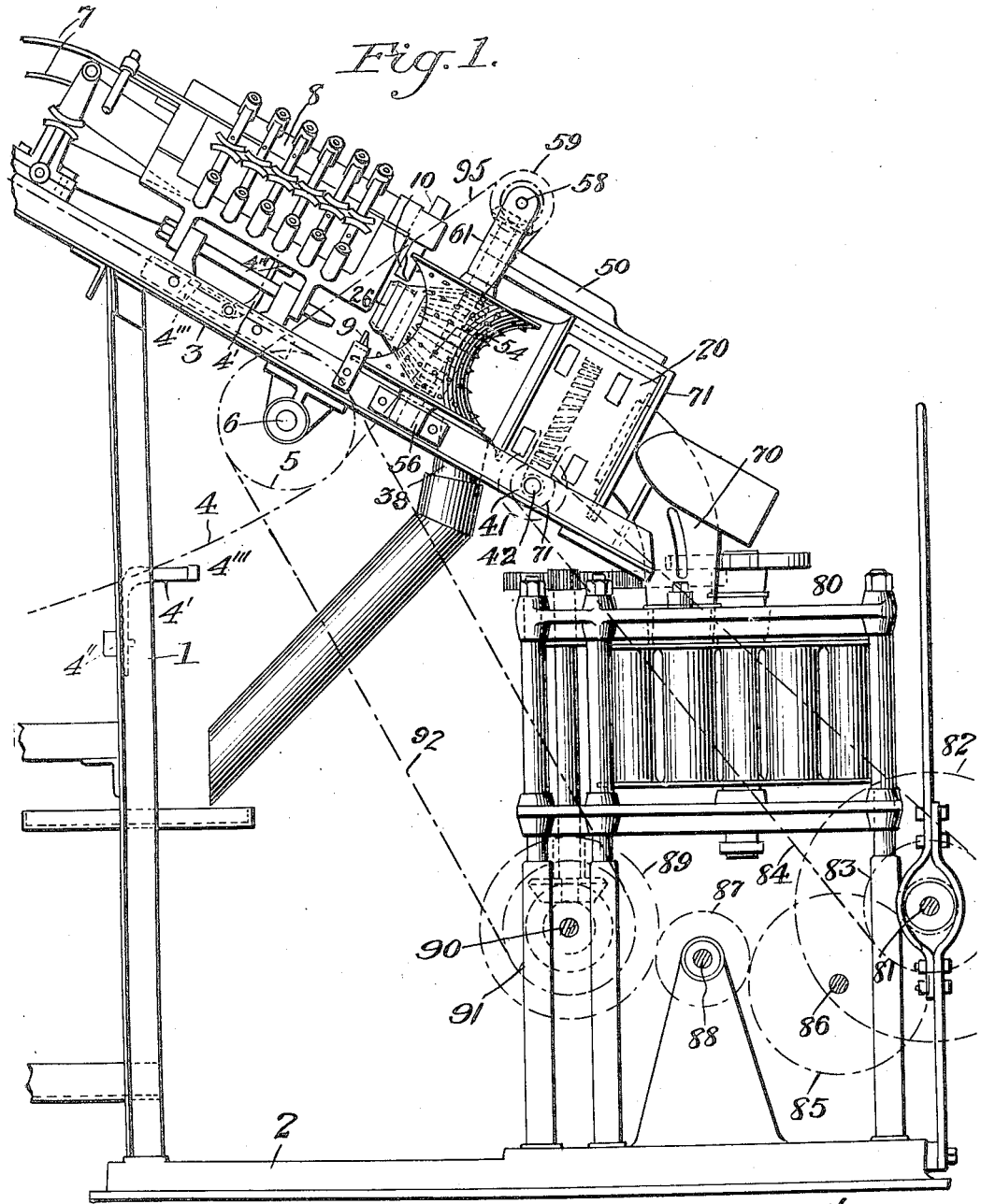

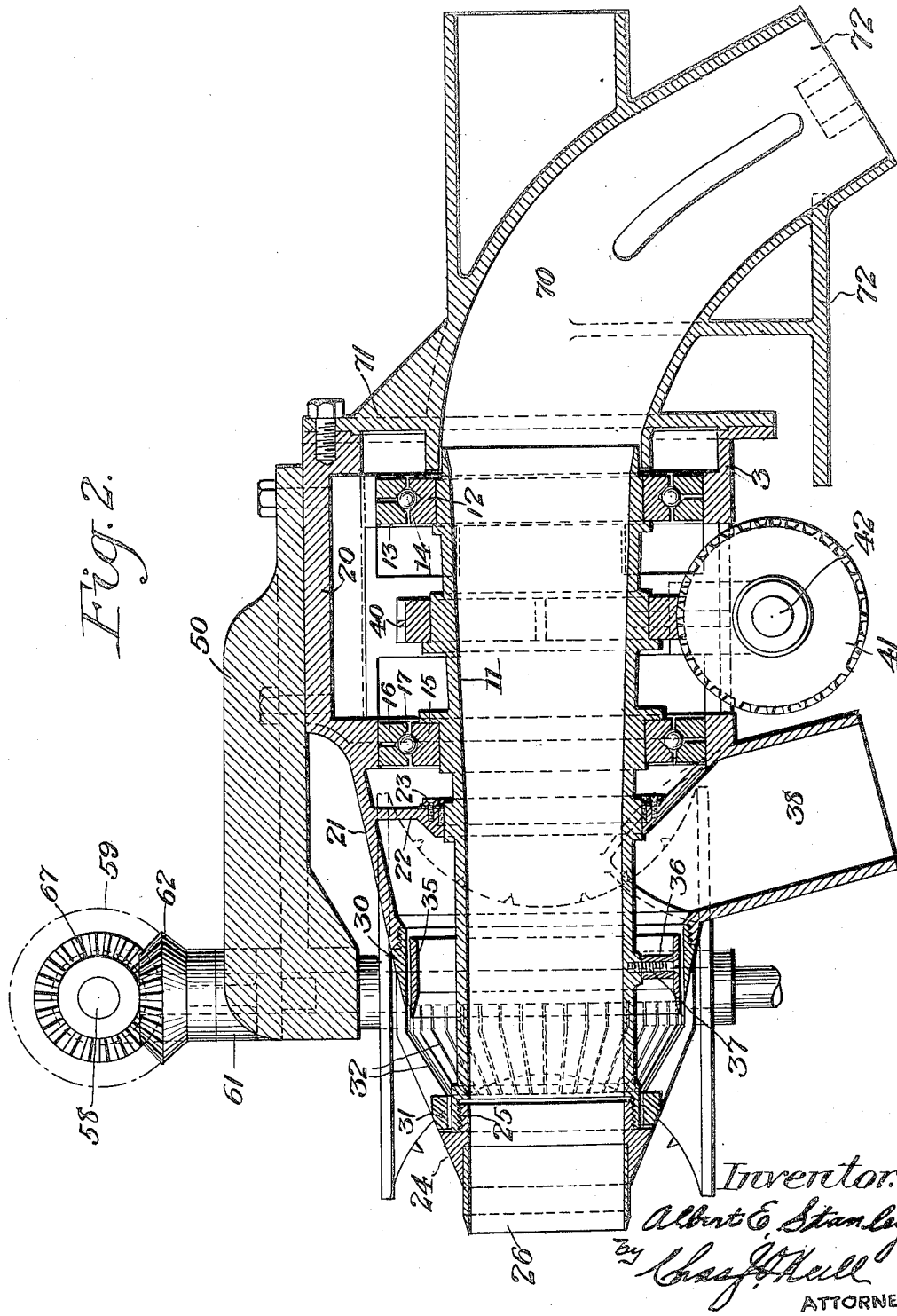

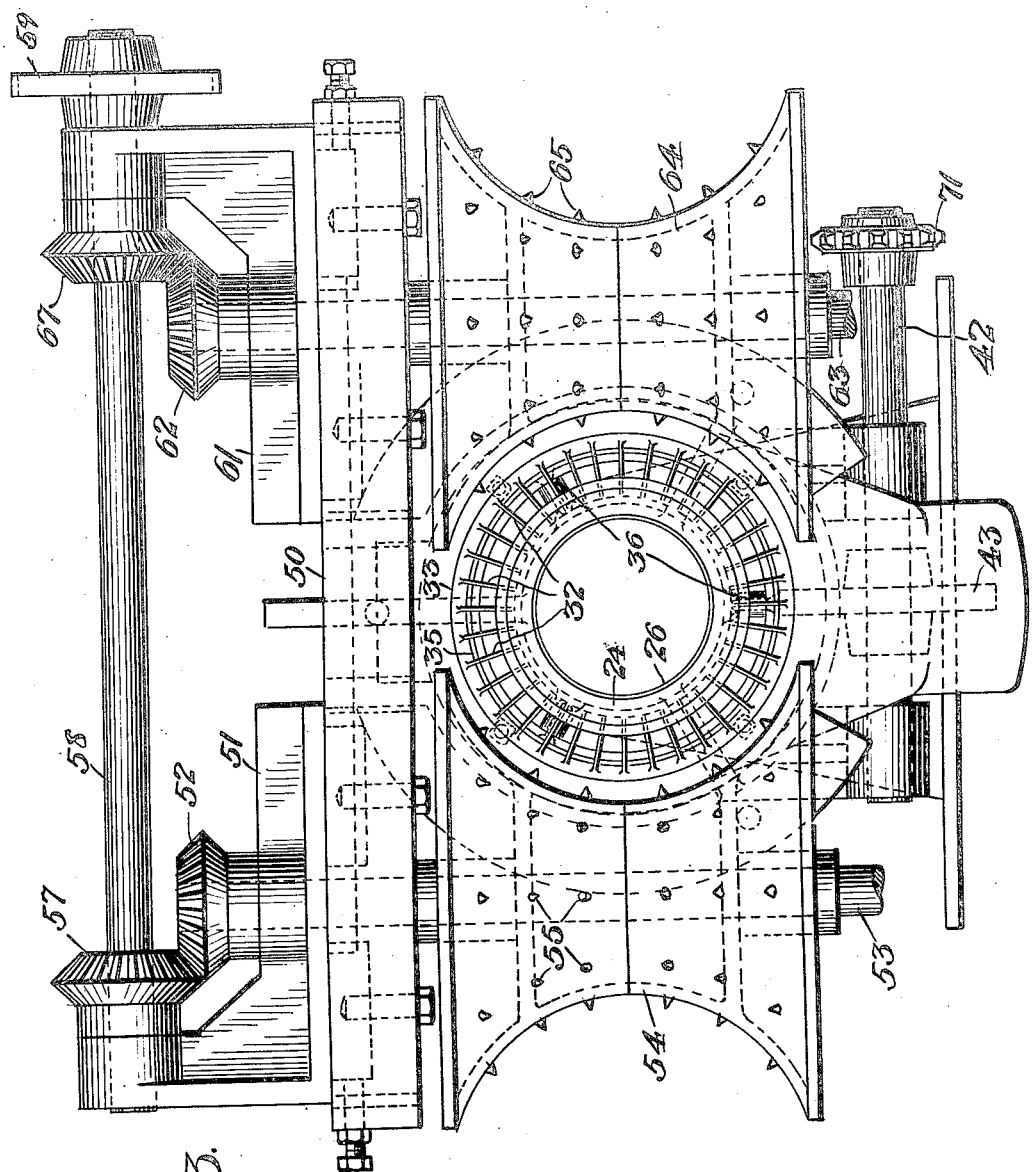

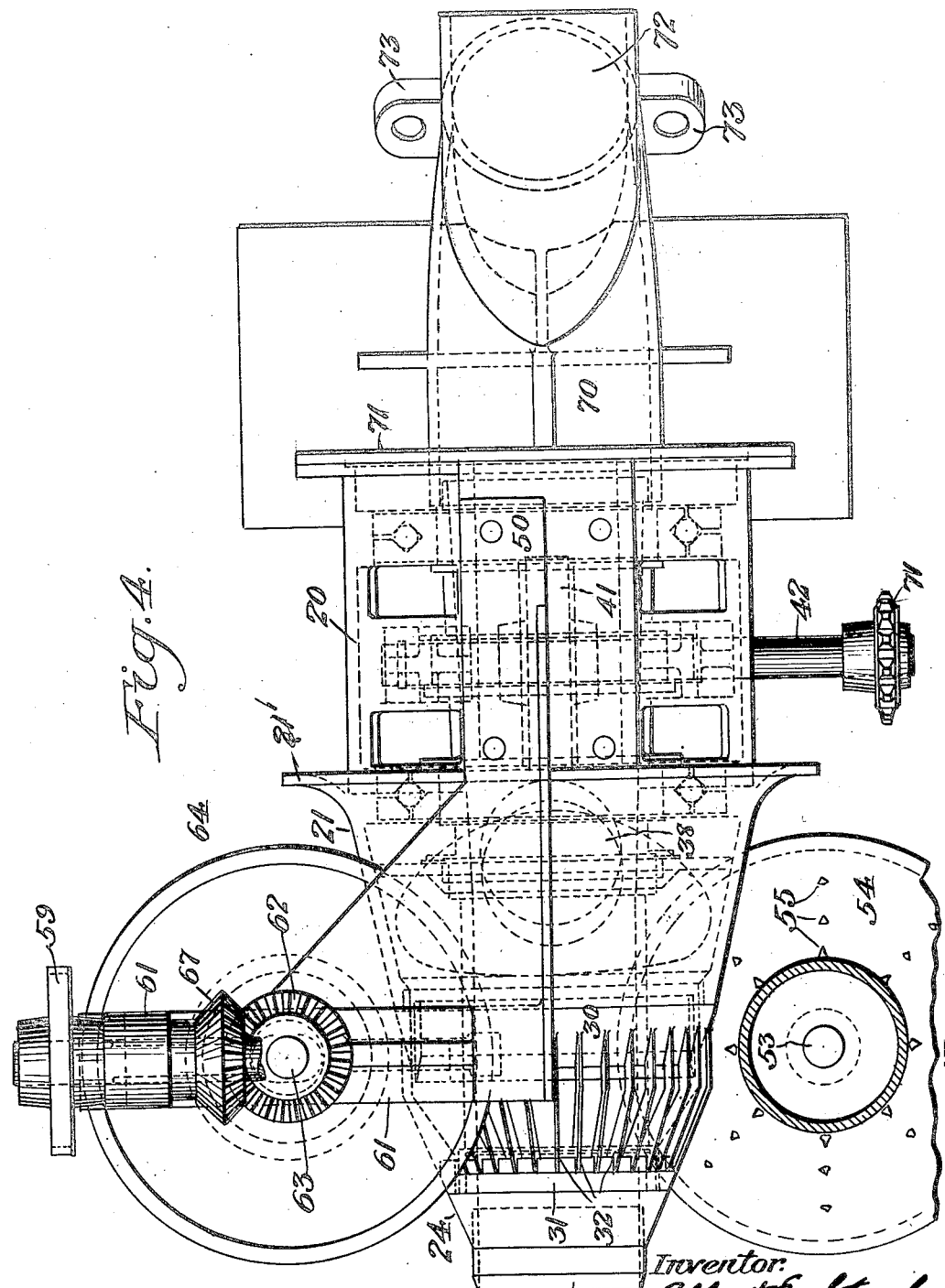

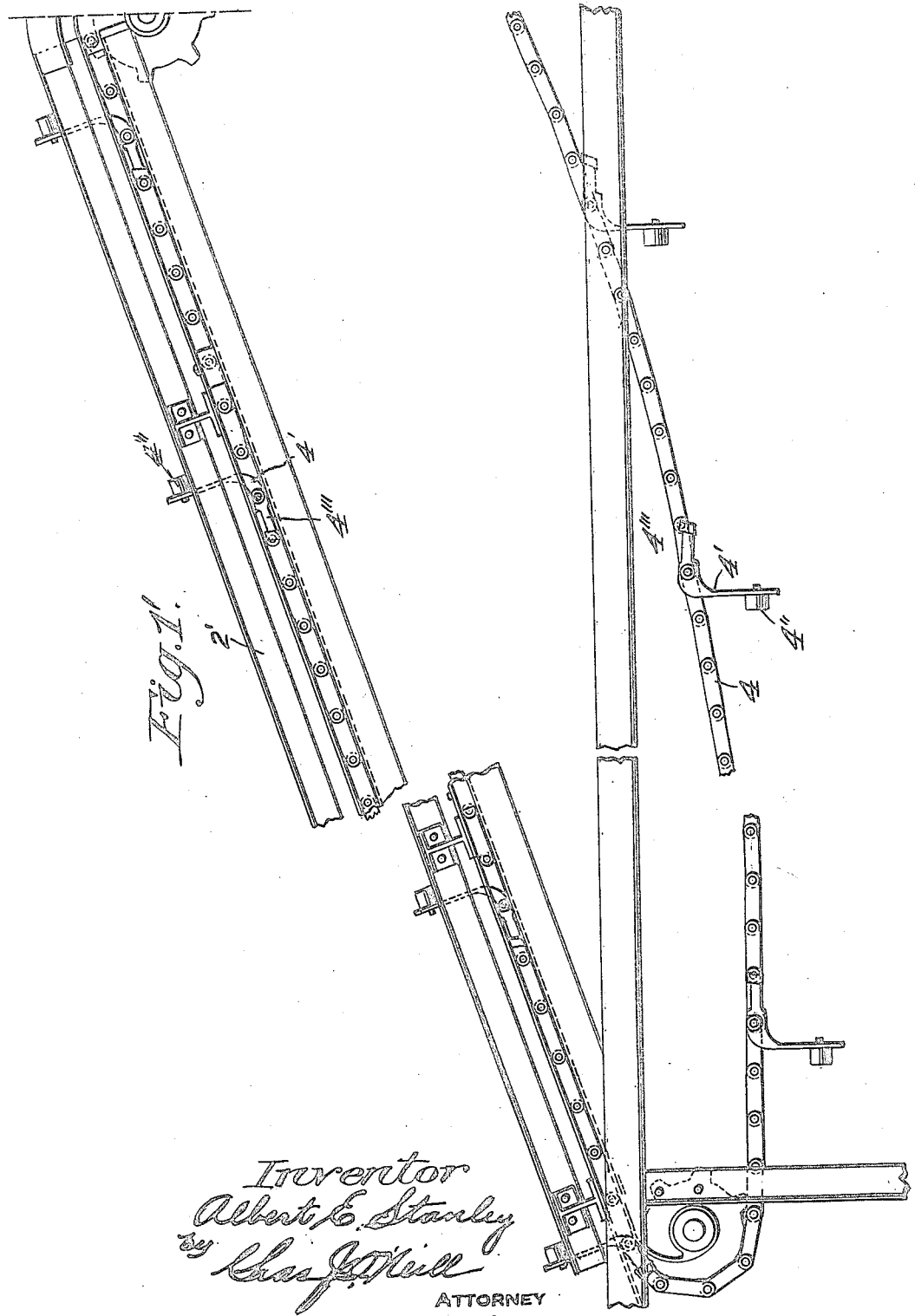

1,430,124

UNITED STATES PATENT OFFICE.

ALBERT ERNEST STANLEY, OF HONOLULU, TERRITORY OF HAWAII, ASSIGNOR TO HAWAIIAN PINEAPPLE COMPANY, LIMITED, OF HONOLULU, TERRITORY OF HAWAII, A CORPORATION OF HAWAII.

MACHINE FOR TREATING FRUIT.

Application filed May 8, 1922. Serial No. 559,389.

*To all whom it may concern:*

Be it known that I, ALBERT E. STANLEY, a citizen of the United States, residing at Honolulu, Territory of Hawaii, have invented certain new and useful Improvements in Machines for Treating Fruit; and I do hereby declare the following to be a full, clear, and exact description of the invention, such as will enable others skilled in the art to which it appertains to make and use the same.

The invention relates to certain new and useful improvements in machines for treating fruit, more particularly fruit of the pineapple class, in preparation for canning.

In the preparation of pineapple for canning it is a common practice to pass the fruit through sizing machines for removing a central cylinder of the fruit of a diameter suitable for the size of the can. The outer shells have the hard rind of the fruit on the outside, but on the inside of this there is a layer of good fruit of a thickness varying with the size of the fruit, each layer also varying in thickness from the greatest diameter of the fruit down to the rounded ends of the fruit. It is the usual practice to slit these shells longitudinally in the sizing machine and carry the slit shells or parts of shells on belts or other conveyers to machines which cut away the layer of fruit flesh from the shells, the machines employed for this latter purpose are known as eradicators which shave off as much of the good flesh as is practicable. In transporting the shells from the sizer to the eradicator the shells are more or less tumbled about and dirt from the rinds frequently contaminate the good flesh. It is, therefore, difficult and practically impossible to procure a product of extra good quality of meat by the operation of the older type of machines. Furthermore, as a general rule, it has been found necessary to provide two eradicators for each sizing machine.

An object of the present invention is to produce an eradicator or mechanism for removing the good fruit from the shells as an attachment or unitary element in the construction of a sizing machine, so that the sizing of the fruit and elimination of the remnantal flesh from the shells is simultaneously effected, thus avoiding the necessity for transporting the shells from the sizer to the eradicator, with the attendant contamination of the good flesh, and, in case separate machines are employed the further necessity of hand feeding the shells to the eradicator. To these ends the invention comprises a rotary tubular sizing head, to which the fruit is forwarded by a suitable conveyor chain provided with pivoted detents engaging the fruit, each detent having a projecting boss which engages the fruit and forces it completely into the cutting element of the sizing head, means surrounding the head for trimming the meat from the shells and means for feeding the shells to the trimming means. The trimming means comprising an annular grid, having longitudinal bars which cut through the meat adhering to the shells, and a knife, preferably annular in form, concentric with and attached to the sizing head, which knife is disposed adjacent the inner face of the grid and serves to cut or trim the fruit from the shells as the latter are fed over the grid. The means for feeding the shells over the grid preferably takes the form of two concave rollers disposed on opposite sides of the grid and sizing head, said rollers having their faces provided with spikes which engage the outer rinds of the shells, the general contour of the faces of the feed rollers being such as to hold the shells in close engagement with the grid adjacent the trimming knife, so that practically all of the meat is cut from the shells and is discharged from a separate chute, while the shells are diverted from the grid over the adjacent housing supporting the latter, and ultimately discharged from the machine by a separate chute or conveyor.

The invention is illustrated in the accompanying drawings in which—

Fig. 1 is a side elevation of the complete machine for centering, sizing, trimming and coring the fruit and removing the meat from the shells, the forward portion of the machine being omitted.

Fig. 1' is a side elevation of the front part of the machine showing the feed conveyor.

Fig. 2 is a vertical longitudinal section through the sizing head and eradicator;

Fig. 3 is a front elevation of the latter.

Fig. 4 is a plan view, partly in section, of the sizing head and eradicator.

Referring to the drawings 1 indicates the general frame work of the machine, which is provided with a base portion 2. The forward portion of the machine is provided with an inclined guide way, not shown, up which the pineapples are fed, in spaced relation, by means of a conveyor chain 4 provided with pivoted dogs or abutments 4′ generally rectangular in shape, each dog having a projecting boss 4″ on its forward face to engage the pineapples and rearwardly extending arms 4‴ which straddle the chain and serve as means for tripping the dog just before the latter reaches the sizing head of the machine. An upper section 3 of the frame supports the centering device, the sizing head and the eradicating device. The fruit centering device, through which the conveyor chain 4 passes the pineapples, and which is broadly indicated at 8, is of the same general type as that disclosed in the patent to H. G. Ginaca, No. 1,060,248, dated April 29, 1913, and therefore need not be particularly described.

As indicated the pineapples are fed by the conveyor chain 4 through the centering device 8 and delvered from the latter in axial alignment with the sizing head which cuts or excises a cylinder from each pineapple. The sizing head comprises a tubular body 11, the bore of which is substantially cylindrical at its forward end and is gradually flared at its rear end. The tubular member 11 is rotatably journalled in suitable anti-friction bearings, comprising raceways 12 and 13, 15 and 16, with interposed balls 14 and 17 respectively, raceways 12 and 15 being secured to the outer peripheral surface of the tubular head 11 and raceways 13 and 16 being secured on the interior of a hollow housing 20, which in turn is mounted upon inclined section 3 of the machine frame, as more particularly illustrated in Figs. 1 and 2. Having a screw threaded engagement 25 with the forward end of the tubular head 11 is an annular nipple 24, having a general frusto-conical outer surface, and having mounted in its forward end an annular knife 26, the several parts being so arranged that the openings through the knife, the nipple and the tubular member 11 constitute a passageway through which the cylindrical sections of the fruit, cut out of the body of the pineapple by the knife 26, pass and are ultimately discharged through a suitable spout to a machine for trimming off the ends and coring the cylindrical sections, the machine being broadly indicated by reference numeral 80, said machine being of the same general type as that illustrated in the patent to H. G. Ginaca, No. 1,112,130, dated September 29, 1914, and which therefore needs no particular description.

Secured to the peripheral surface of the tubular member 11 of the sizing head is a worm pinion 40, which is driven by a worm wheel 41 secured to a counter-shaft 42, mounted in suitable journal bearings in the frame section 3.

The housing 20 is provided at its forward end with a tapering section 21 with a deflecting flange 21′ at its rear. The tapering forward section 21 of the housing is hollow and is provided with a partition 22 which surrounds the peripheral surface of the tubular member 11 and is provided with a suitable packing 23 to prevent fruit juices from getting into the hollow portion of the housing 20 containing the anti-friction bearings and the driving mechanism. Removably attached to the forward end of the housing section 21, by a suitable screw threaded coupling, is a grid member comprising an annular rear section 30, conforming generally to the conical contour of the outer surface of the housing section 21, and a forward ring-like section 31, the forward corner of which constitutes an extension of the conical surface of the thimble 24. Connecting the ring elements 30 and 31 of the grid are narrow bars 32 spaced peripherally, and collectively constituting the grid proper, the forward portion of which, is generally frusto-conical and the rear portion substantially cylindrical. The outer ring-like member 31 of the grid surrounds the forward end of the tubular member 11 just to the rear of the thimble 24 so that the sizing knife and the thimble project beyond the forward end of the grid, as clearly indicated in Figs. 2 and 4.

Disposed concentrally with the tubular member 11 of the sizing head and secured to the latter by spacing thimbles 36 and bolts 37 is an annular knife 35, which rotates with the sizing head and lies in close proximity to the inner face of the grid with the cutting edge of the knife adjacent the rear portions of the annularly disposed bars 32. Extending from the hollow portion of the housing section 21 is a discharge spout 38, which is connected with a suitable chute or conveyor which delivers the meat cut from the shells to any desired point, such for example, as the receiving table mounted on the main frame 1, as illustrated in Fig. 1.

Secured to the upper face of the housing 20 is a bracket 50 having a transverse forward section overlying the grid and sizing head and having longitudinally adjustably mounted thereon angular brackets 51 and 61, in which is journalled a shaft 58 having on its outer end a sprocket wheel 59 and two bevel gears 57 and 67. Journalled in the brackets 51 and 61 and in suitable bearings on the frame section 3 are shafts 53 and 63 respectively, to the upper ends of which are secured bevel pinions 52 and 62 which mesh with bevel gears 57 and 67 respectively.

Secured to the shafts 53 and 63 are two feed rollers 54 and 64 which are provided with concave faces, the curvature of which conforms substantially with that of the grid surface, the face of each feed roller being provided with spikes or tines 55 and 65 respectively.

Secured on opposite sides of the knife 26 of the sizing head and preferably to the frame section 3 and the rear end of the centering element 8 are two knives 9 and 10, which slit the rinds of the pineapples as the latter are forced into engagement with the knife of the sizing head, so that the shell is ultimately divided into two sections, which are fed over the grid of the eradicating element by the respective feed rollers 54 and 64.

Secured to the rear end of the housing 20 is a casting 72 including the spout or discharge conduit 70, which delivers the cylindrical sections excised from the fruit to the trimming and coring machine 80, which latter trims off the ends of each of the fruit sections and removes the cores therefrom, ultimately delivering the accurately sized, trimmed, and cored sections ready for the canning operation.

The operation of the machine as described is substantially automatic and the several elements are operated from a common power shaft 81, which may be driven by a belt pulley 82, or if desired, by a separate motor, the pulley or the motor being connected to the shaft by means of a suitable clutch, conventionally illustrated in Fig. 1. Mounted on the shaft 81 is a sprocket wheel 83, which is connected by a sprocket chain 84 with the sprocket wheel 71 on shaft 42 upon which is mounted the worm gear 41 which in turn drives the tubular member 11 of the sizing head. A gear 85 mounted on counter shaft 86 drives an intermediate gear 87 mounted on a shaft 88, which gear 87 in turn engages a master gear 89 on the frame of the trimming and coring machine 80. The component elements of the latter machine are driven by a suitable gearing mounted on a shaft 90 carrying the gear 89. Also mounted on the shaft 90 is a sprocket wheel 91 which is connected by a sprocket chain 92 with a suitable sprocket wheel mounted on shaft 6 connected to the under side of the frame member 3, which shaft 6 carries one of the sprocket wheels 5 of the conveyor chain 4. A second sprocket wheel on the shaft 6 drives a sprocket chain 95 which engages the sprocket wheel 59 on the shaft 58 by means of which the feed rollers 54 and 64 are actuated. The several elements of the gearing are indicated in diagram only in order to avoid possible complication and confusion in the illustrating of Fig. 1 of the drawing and obviously the gearing aforesaid may take any appropriate form.

The operation of the machine as described is as follows. The pineapples are delivered to the lower end of the guide or conveyor 2', up which they are carried by the pivoted dogs or detents 4' on the conveyor chain 4, passed through the centering element 8, which accurately centers the pineapples, irrespective of their size, in axial alignment with the knife 26 of the sizing head. The projecting boss 4'' on the forward face of each pivoted dog or detent 4' is of a diameter considerably less than that of the sizing knife and of a length such that the fruit will completely pass the knife on the one hand and the boss will be thrown back clear of the knife as the hinged dog or detent is tripped automatically as the feeding of the fruit to the sizing head is completed. As the fruit passes into engagement with the knife of the sizing head the knives 9 and 10 slit the outer rind and thereby divide the shell, comprising the rind and attached meat left by the sizing head, into two sections, the central cylinder of the fruit passing through the knife of the sizing head into the tubular member of the latter, and ultimately discharged through the throat 70 into the trimming and coring machine 80 When the central cylinder of the fruit has been excised by the knife of the sizing head and the shell slit into sections by the knives 9 and 10, the respective shell sections are engaged by the feed rollers 54 and 64 and drawn forward over the grid, the flesh or meat portion of the fruit adhearing to the shell sections being forced between the bars 32 of the grid and thereby divided longitudinally into strips which in turn are cut away from the rind by the rapidly revolving knife 35, which, as indicated, lies just below the cylindrical rear portion of the grid, so that practically all of the valuable meat portion is cut away from the rind, without, however, cutting off the ends of any of the eyes or any portion of the hard outer rind, the portion of the meat so severed passing through the knife 35 into the hollow interior of the housing section 21, and being ultimately discharged from the spout 38 into a chute or conveyor by which it is delivered to the table or other point of collection. The rinds or outer portions of the shell are forced by the feed rollers over the rear ring 30 of the grid and the conical surface of the housing section 21, and when freed from the rollers drop into a suitable conveyor or chute, not shown, which takes them away from the machine.

As indicated the entire operation of the apparatus is automatic and delivers the sized cylindrical sections of the fruit properly trimmed and cored ready for canning and also trims practically all of the valuable flesh or meat left adhering to the shells by the sizing machine, leaving the trimmed portions of the flesh or meat in prime condition for canning, preserving, or other suitable uses.

Some of the salient advantages resulting from the particular construction and operation of the machine, as described, are, first, that a cleaner and more valuable product from the flesh remaining inside of the pineapple shells coming from the sizing operation is obtained; second, a material economy of labor results, since the handling of the shells from the sizing machine to the eradicator is avoided, and little labor is required for cleaning out dirt and unsound fruit from the product, prior to canning; third, a material economy in the cost of installation and operation, by reason of the fact that one eradicator element takes care of all of the shells operated upon by one sizing machine, and no conveyor system or hand transportation is required for the shells from the sizing machine to the eradicator. Furthermore the machine is compact and requires much less space than the older types of apparatus, involving separate elements or machines for the several operations, and substantially all of the valuable flesh or meat of the fruit is saved and delivered, either in the form of the sized cylindrical sections cut out by the sizing head, or in the form of strips which are trimmed from the shells by the eradicator, both forms of the product being delivered from the machine without danger of contamination by dirt from the shells or from outside sources.

What I claim is:

1. A machine for treating fruit, comprising a rotary sizing head, and means surrounding the head for trimming the meat from the shells.

2. A machine for treating fruit, comprising a rotary tubular sizing head, and means surrounding the head for trimming the meat from the shells.

3. A machine for treating fruit, comprising a rotary tubular sizing head, an annular grid surrounding the head and a knife disposed adjacent the inner face of the grid and movable relatively thereto for trimming the meat from the shells.

4. A machine for treating fruit, comprising a rotary tubular sizing head, an annular grid surrounding the head, and an annular knife disposed adjacent the inner face of the grid and movable relatively thereto for trimming the meat from the shells.

5. A machine for treating fruit, comprising a rotary tubular sizing head, an annular grid surrounding the head, an annular knife secured to and spaced from the tubular sizing head and disposed adjacent the inner face of the grid for trimming the meat from the shells.

6. A machine for treating fruit, comprising a rotary tubular sizing head, means surrounding the head for trimming the meat from the shells, and means for feeding the shells to the trimming means.

7. A machine for treating fruit, comprising a rotary tubular sizing head, an annular grid surrounding the head, means for feeding the shells over the grid, and means cooperating with the grid and carried by the sizing head for trimming the meat from the shells.

8. A machine for treating fruit, comprising a rotary tubular sizing head, an annular grid surrounding the head, feed rollers for feeding the shells over the grid, and means cooperating with the grid and carried by the sizing head for trimming the meat from the shells.

9. A machine for treating fruit, comprising a rotary tubular sizing head, an annular grid surrounding the head, concave feed rollers for feeding the shells over the grid, and means cooperating with the grid and carried by the sizing head for trimming the meat from the shells.

10. A machine for treating fruit, comprising a rotary tubular sizing head, an annular grid surrounding the head, concave feed rollers having spiked surfaces for feeding the shells over the grid, and means cooperating with the grid and carried by the sizing head for trimming the meat from the shells.

11. A machine for treating fruit, comprising a rotary tubular sizing head, means adjacent the sizing head for slitting the shells, and means surrounding the head for trimming the meat from the shells.

12. A machine for treating fruit, comprising a rotary tubular sizing head, an annular grid surrounding the head, means in advance of the grid for slitting the shells, feed rollers for feeding the shells over the grid, and a knife disposed adjacent the inner surface of the grid secured to and spaced from the tubular sizing head for trimming the meat from the shells.

13. A machine for treating fruit, comprising a rotary tubular sizing head, an annular grid having a frusto-conical forward section and a cylindrical rear section, an annular knife secured to and spaced from the sizing head and disposed adjacent the cylindrical section of the grid, and feed rollers located on opposite sides of the grid for feeding the shells over the grid.

14. A machine for treating fruit, comprising a rotary tubular sizing head, an annular grid having a frusto-conical forward section and a cylindrical rear section, an annular knife secured to and spaced from the sizing head and disposed adjacent the cylindrical section of the grid, and concave feed rollers located on opposite sides of the grid for feeding the shells over the grid.

15. A machine for treating fruit, comprising a rotary tubular sizing head, knives on opposite sides of the head for slitting the shells, an annular grid having a frusto-conical forward section and a cylindrical rear section, an annular knife secured to and spaced from the sizing head and disposed adjacent the cylindrical section of the grid, and concave feed rollers located on opposite sides of the grid for feeding the shells over the grid.

16. A machine for treating fruit, comprising an annular grid, and a rotary knife disposed within the grid and having its cutting edge adjacent to and parallel with the inner surface of the grid.

17. A machine for treating fruit, comprising an annular grid having longitudinal bars, a cylindrical revoluble knife located within the annular grid concentric with the latter and with its cutting edge adjacent the inner face of the grid, and feed rollers having concave faces to conform to the curvature of the grid located on opposite sides of the grid to feed the shells over the grid.

18. A machine for treating fruit, comprising a rotary tubular sizing head, and a conveyor for feeding the fruit to the sizing head including a conveyor chain having pivoted dogs thereon, each dog having a forwardly extending boss on its front face adapted to force the fruit completely past the sizing knife.

In testimony whereof I affix my signature.

ALBERT ERNEST STANLEY.